United States Patent
Kusunoki et al.

(10) Patent No.: US 6,570,321 B1
(45) Date of Patent: May 27, 2003

(54) THIN-FILM ELECTRON SOURCE, PROCESS FOR MANUFACTURING THIN-FILM ELECTRON SOURCE, AND DISPLAY

(75) Inventors: Toshiaki Kusunoki, Tokorozawa (JP); Mutsumi Suzuki, Kodaira (JP); Masakazu Sagawa, Inagi (JP); Makoto Okai, Tokorozawa (JP); Akitoshi Ishizaka, Chiba (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/031,380

(22) PCT Filed: Sep. 6, 1999

(86) PCT No.: PCT/JP99/04820
§ 371 (c)(1),
(2), (4) Date: Jan. 18, 2002

(87) PCT Pub. No.: WO01/18839
PCT Pub. Date: Mar. 15, 2001

(51) Int. Cl.$^7$ .............................. H01J 1/62; C25D 5/02

(52) U.S. Cl. ..................... 313/495; 315/169.3; 205/122

(58) Field of Search ................ 315/169.3; 313/495, 313/309, 336, 351, 346 R; 205/122, 170, 159, 183, 188, 191

(56) References Cited

U.S. PATENT DOCUMENTS

| | | | | |
|---|---|---|---|---|
| 5,847,504 A | * | 12/1998 | Baldi | 313/495 |
| 5,944,975 A | * | 8/1999 | Wilson et al. | 205/122 |
| 6,251,690 B1 | * | 6/2001 | Kulmala et al. | 436/518 |
| 6,482,686 B1 | * | 11/2002 | Takemura | 438/166 |

FOREIGN PATENT DOCUMENTS

| | | |
|---|---|---|
| JP | 63-257157 | 4/1987 |
| JP | 2-306520 | 5/1989 |
| JP | 7-65710 | 8/1993 |
| JP | 9-139175 | 11/1995 |

* cited by examiner

*Primary Examiner*—Don Wong
*Assistant Examiner*—Chuc Tran

(57) ABSTRACT

A process for manufacturing a thin-film electron source including a lower electrode (11), an upper electrode, and an insulating layer sandwiched between the lower electrode (11) and the upper electrode. The process comprises a first step of forming an anodized film over the surface of the lower electrode (11) by an anodizing method, a second step of etching the surface side of the anodized film, and a third step of forming an anodized film again over the surface of the lower electrode (11) by an anodizing method to form said insulating layer. As a result, the film thickness of such an outer layer (26) of the insulating layer containing much impurity can be reduced to reduce the number of electron trapped.

33 Claims, 14 Drawing Sheets

A-A' CROSS SECTION VIEW

B-B' CROSS SECTION VIEW

BASE ELECTRODE PROCESS

PROTECTIVE INSULATOR PROCESS

TUNNELING INSULATOR PROCESS

ETCHBACK AND REOXIDATION PROCESS

TOP ELECTRODE'S BUSLINE PROCESS

TOP ELECTRODE PROCESS

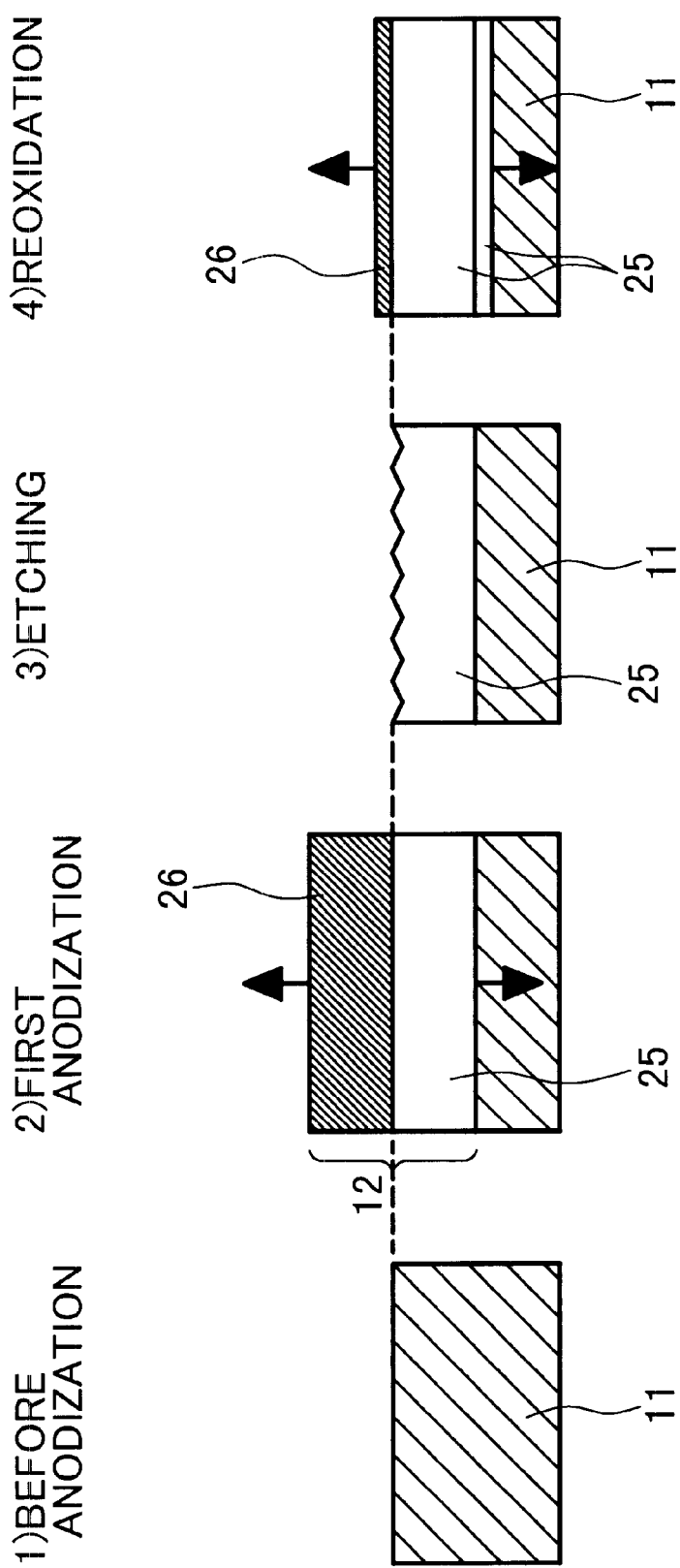

A-A' CROSS SECTION VIEW

B-B' CROSS SECTION VIEW

A-A' CROSS-SECTION VIEW

B-B' CROSS-SECTION VIEW

THIN-FILM ELECTRON SOURCE, PROCESS FOR MANUFACTURING THIN-FILM ELECTRON SOURCE, AND DISPLAY

TECHNICAL FIELD

The present invention relates to a thin film cathode, a process or method for manufacturing the thin film cathode and a display device, and more particularly, to a technique which can be effectively applied to a thin film cathode which has a three-layer structure of a base electrode, an insulator layer and a top electrode and wherein an anodic oxide is used as the insulator layer.

BACKGROUND ART

A thin film cathode is arranged, for example, so that a voltage is applied between top and base electrodes of a three-layer thin film structure of the top electrode, insulator layer and base electrode to emit electrons into a vacuum space from a surface of the top electrode.

A metal-insulator-metal (MIM) type and a metal-insulator-semiconductor (MIS) type thin film cathode, wherein a metal, insulator and metal layers are laminated and wherein a metal, insulator and semiconductor layers are laminated, respectively, are known as ones of such thin film cathodes.

The MIM type thin film cathode is described, e.g., in JP-A-7-65710.

FIG. 14 is a diagram for explaining the operational principle of a thin film cathode.

When a driving voltage Vd is applied from a driving voltage source to between a top electrode 13 and a base electrode 11 so that an electric field becomes about 1–10 MV/cm within a tunneling insulator 12, electrons in the vicinity of a Fermi level in the base electrode 11 are transmitted through a barrier by a tunneling effect, injected into a conduction band of the tunneling insulator 12 and top electrode 13 to be formed as hot electrons.

Ones of these hot electrons having energies not smaller than a work function φ of the top electrode 13 are emitted into a vacuum space 18.

In this case, when a plurality of the top electrodes 13 and a plurality of the base electrodes 11 are provided in the form of lines so that these top and base electrode lines intersect with each other and thus a thin film cathode is provided in the form of a matrix; an electron beam can be generated from an arbitrary location. As a result, the thin film cathode can be used as an electron source of a display device or be applied as an electron source of an electron beam lithography system.

Electron emission has been observed conventionally from a metal-insulator-metal (MIM) type structure of gold (Au), aluminum oxide (referred to as $Al_2O_3$, hereinafter) and aluminum (referred to as Al, hereinafter) or the like.

In general, a high quality of tunneling insulator 12 for a thin film cathode is made of an anodic oxide.

In particular, a barrier type (no-porous) anodic oxide of Al or Al alloy is uniform in its thickness and can be formed in a defect-free insulator having a high breakdown voltage and a large surface area.

For this reason, this is most suitable as a method for forming an insulator in a thin film cathode mainly applied to a display device or the like.

However, the anodic oxidation method for forming an anodic oxide has a defect that, since this method is a wet oxidation method in an electrolyte, impurities tend to be easily introduced in the film.

FIG. 15 shows, in a model form, a method for forming an anodic oxide.

Anodic oxidation can be advanced by using the base electrode 11 as an anode in an electrolyte 21 and a mesh electrode 22 of platinum (Pt) or the like as a cathode and by applying an anodizing voltage Vox between them from an anodizing voltage source.

In an interface between the base electrode 11 of Al being anodically oxidized and the tunneling insulator 12 of $Al_2O_3$, a reaction of oxygen ions ($O^{2-}$) supplied from the electrolyte 21 with the Al material of the base electrode causes oxidation to progress.

In an interface between the tunneling insulator 12 of $Al_2O_3$ and the electrolyte 21, further, a reaction of aluminum ions ($Al^{3+}$) supplied from the base electrode (Al electrode) 11 with oxygen ions ($O^{2-}$) supplied from the electrolyte 21 causes the $Al_2O_3$ insulator to grow.

In this way, the growth of the $Al_2O_3$ film as the tunneling insulator 12 takes place in the two interfaces. However, the growth in the interface between the base electrode 11 and tunneling insulator 12 occurs in an environment free of impurities other than Al and oxygen (O) and thus a relatively pure $Al_2O_3$ film can grow. Meanwhile, in the interface between the tunneling insulator 12 and electrolyte 21, electrolyte's anions 24 in the electrolyte 21 are incorporated into $Al_2O_3$ to grow an $Al_2O_3$ film containing lots of impurities.

Accordingly the tunneling insulator 12 has a double structure of a less-impurity inner layer 25 of an insulator provided inside of a surface position at the time of starting the anodic oxidation and a more-impurity outer layer 26 of the insulator provided outside thereof.

A ratio in film thickness between the inner and outer layers is determined by a transport number of aluminum ions ($Al^{3+}$) and oxygen ions ($O^{2-}$) during the anodic oxidation and by the type of the anodizing electrolyte.

In the case of an $Al_2O_3$ barrier type anodic oxide prepared with use of an electrolyte of organic acid such as ammonium salt of tartaric acid or citric acid and with use of nonaqueous solvent such as ethylene glycol, a transport number of ammonium ions ($Al^{3+}$) is 0.6 and a transport number of oxygen ions ($O^{2-}$) is 0.4.

Therefore the film thickness ratio of the outer layer 25 to the insulator reaches 60% and the insulator's outer layer 25 contains carbon as impurities.

Similarly, when an aqueous solution of ammonium borate capable of forming the barrier type anodic oxide is used as the anodizing electrolyte, main impurities are boron, the transport number of aluminum ions ($Al^{3+}$) is 0.4 and the transport number of oxygen ions ($O^{2-}$) is 0.6.

Even in this case, the film thickness ratio of the outer layer 25 to the insulator is 40%.

FIG. 16 shows results when a mixture solution of aqueous tartaric acid ammonium and ethylene glycol is used, and when the composition of a tunneling insulator in a thin film cathode formed by an anodic oxidation method is analyzed and measured by a glow discharge spectroscopy.

The amount of carbon as impurities in the tunneling insulator is much in a region about 60% on its surface side, stepwise decreases in the tunneling insulator, and is less in a region about 40% inside thereof.

In this way, the double structure of the tunneling insulator 12 is clearly shown by analysis in a composition depth direction.

FIG. 17 shows a conduction band when such a thin film cathode is operated.

Electrons injected from the base electrode 11 by a tunnel phenomenon of Fowler-Nordheim run through the conduction band of the tunneling insulator 12 and reach the top electrode 13.

At this time, electrons run through the insulator's outer layer 26. However, since the insulator's outer layer 26 contains more impurities, the amount of structural fault becomes much and the amount of electron trap 27 becomes much.

As the number of electrons trapped in the insulator's outer layer 26 becomes large, an electric field within the tunneling insulator 12 becomes low on its base electrode 11 side and high on its top electrode 13 side as shown in FIG. 17.

In this case, since the tunnel injection electric field is relaxed, a diode current decreases and thus an emission current also decreases.

Further, since an electric field becomes locally strong in the vicinity of an interface between the insulator's outer layer 26 and top electrode, this leads to destruction of the tunneling insulator 12, thus reducing the reliability of a thin film cathode.

The present invention has been made for the purpose of solving the problems in the prior art. It is therefore an object of the present invention to provide a technique for a thin film cathode which can reduce electron trap in an outer layer having much impurity within an insulator formed by an anodic oxidation method to thereby prevent decrease of an emission current and reduction of reliability.

Another object of the present invention is to provide a technique for manufacturing a thin film cathode, which can reduce a ratio of an outer layer having much impurity within an insulator formed by an anodic oxidation method.

A further object of the present invention is to provide a technique wherein a thin film cathode is used in a display device to thereby provide less brightness reduction and a long life to the display device.

The above and other objects and novel features of the present invention will be apparent from description of the present specification and accompanying drawings.

DISCLOSURE OF INVENTION

As mentioned above, the thickness of an anodic oxide and a film thickness ratio between insulator's outer and inner layers are determined based on the applied anodizing voltage, the material of a base electrode, the transport number of oxygen ion, and the type of an anodizing electrolyte.

The inventors of the present invention have paid attention to this respect, and investigated to seek how to increase the ratio of the insulator's inner layer having less impurity in an anodic oxide, as a method for reducing a ratio of an insulator's outer layer having much impurity in the anodic oxide, while holding the feature of the anodic oxide that can be formed as the defect-free insulator having a uniform thickness, a high breakdown voltage and a large surface area.

As a result, the inventors have found an effective method of forming an insulator made of an anodic oxide on a surface of a base electrode by (etchback step) etching to remove a surface side of the anodic oxide formed on the surface of the base electrode by an anodic oxidation method and thereafter by a step of again performing the anodic oxidation at least once.

The inventors have also found it especially effective that the thickness of the anodic oxide to be formed by the anodic oxidation method on the surface of the base electrode is made larger than a final specification thickness of the insulator at the time of the first anodic oxidation and thereafter the surface side of the anodic oxide is etched and removed, whereby the anodic oxide is made smaller than the final specification thickness of the insulator, and an insulator made of an anodic oxide having the final thickness is again formed by the anodic oxidation method.

That is, the present invention is featured by a thin film cathode which includes an electron emitter of a three-layer thin film structure comprising a base electrode, a top electrode and an insulator provided between the base and top electrodes and formed from an anodic oxide of the base electrode, the electron emitter emitting electrons from a surface of the top electrode when a positive-polarity voltage is applied to the top electrode, and wherein the insulator contains impurities a concentration of which decreases stepwise from the top electrode toward the base electrode and, wherein when assuming a boundary of center of the impurities stepwise decreasing region, forming as an outer layer the top electrode side of the insulator and forming as an inner layer the base electrode side of the insulator with respect to the boundary, a film thickness ratio of the insulator's outer layer to the film thickness of the insulator is smaller than 40%.

Further, the present invention is featured by a thin film cathode which includes an electron emitter of a three-layer thin film structure comprising a base electrode, a top electrode and an insulator provided between the base and top electrodes and formed from an anodic oxide of the base electrode, the electron emitter emitting electrons from a surface of the top electrode when a positive-polarity voltage is applied to the top electrode, and wherein, when a test is conducted wherein an initial current flowing from the top electrode to the base electrode is set to have a current density of $0.2\ A/cm^2$ and a D.C. voltage is applied between the top and base electrodes of the electron emitter, a current flowing from the top electrode to the base electrode is not smaller than 50% of the initial current after 2 hours of the test.

The present invention is featured by a thin film cathode which includes an electron emitter of a three-layer thin film structure comprising a base electrode, a top electrode and an insulator provided between the base and top electrodes and formed from an anodic oxide of the base electrode, the electron emitter emitting electrons from a surface of the top electrode when a positive-polarity voltage is applied to the top electrode, and wherein, when a test is conducted wherein an initial current flowing from the top electrode to the base electrode is set to have a current density of $0.2\ A/cm^2$ and a D.C. voltage is applied between the top and base electrodes of the electron emitter, a shift in a current-driving voltage characteristic is shifted to its high voltage side after two hours with the shift being 0.5 V or less.

Furthermore, the present invention is featured by a thin film cathode which includes an electron emitter of a three-layer thin film structure comprising a base electrode, a top electrode and an insulator provided between the base and top electrodes and formed from an anodic oxide of the base electrode, the electron emitter emitting electrons from a surface of the top electrode when a positive-polarity voltage is applied to the top electrode, and wherein, when a constant current pulse test is conducted wherein a pulse voltage is applied between the top and base electrodes of the electron emitter with a current flowing from the top electrode to the base electrode having a peak current density of $0.2\ A/cm^2$ and with a duty ratio of 1/18.3, an increase in a driving voltage after 714 hours (after 10,000 hours, conversion hours, in the case of a duty ratio of 1/256) is 0.5 V or less.

In addition, the present invention is featured by a method for manufacturing a thin film cathode which includes an electron emitter of a three-layer thin film structure comprising a base electrode, a top electrode and an insulator provided between the base and top electrodes and formed from an anodic oxide of the base electrode, the electron emitter emitting electrons from a surface of the top electrode when a positive-polarity voltage is applied to the top electrode, the method comprising:

a first step of forming an anodic oxide on the surface of the base electrode by an anodic oxidation method at the time of forming an insulator on the surface of the base electrode;

a second step of etching and removing a surface side of the anodic oxide formed in the first step; and a third step of again forming an anodic oxide on the surface of the base electrode by the anodic oxidation method after the second step, the first to third steps being carried out at least once.

The present invention is also featured by a method for manufacturing a thin film cathode which includes an electron emitter of a three-layer thin film structure comprising a base electrode, a top electrode and an insulator provided between the base and top electrodes and formed from an anodic oxide of the base electrode, the electron emitter emitting electrons from a surface of the top electrode when a positive-polarity voltage is applied to the top electrode, the method comprising:

a first step of forming an anodic oxide thicker than a final specification thickness of the insulator on the surface of the base electrode by an anodic oxidation method;

a second step of etching and removing a surface side of the anodic oxide formed in the first step; and a third step of forming an anodic oxide of the final specification thickness on the surface of the base electrode by the anodic oxidation method again after the second step to form the insulator.

The present invention is also featured by forming the anodic oxide 2.5 times thicker than the final specification thickness in the first step.

The present invention is further featured by the base electrode which is made of aluminum or aluminum alloy.

The present invention is featured by a display device comprising:

a first substrate having a cathode array;

a frame; and a second substrate having a phosphor pattern, and wherein a space defined by the first substrate, frame and second substrate is a vacuum atmosphere, and the cathode array of the first substrate is made of any of the above-mentioned thin film cathodes.

BRIEF DESCRIPTION OF DRAWINGS

FIG. 3 shows, in a model form, changes in the film structure of a tunneling insulator prepared by steps of in the present embodiment;

BEST MODE FOR CARRYING OUT THE INVENTION

Figure 1A:
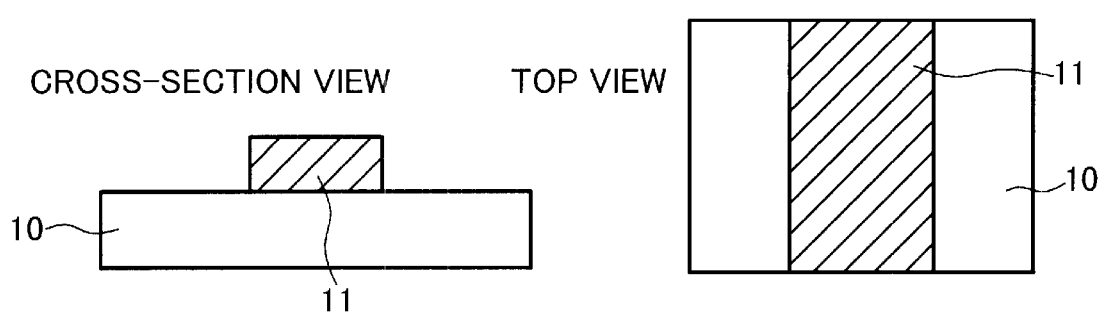
FIGS. 1A to 1C are diagrams for explaining a method for manufacturing a thin film cathode in accordance with a first embodiment of the present invention.

Embodiments of the present invention will be described in details with reference to drawings.

In this connection, in all the drawings for explaining the embodiments, parts having the same functions are denoted by the same reference numerals to omit double explanation thereof.

Embodiment 1

A thin film cathode in accordance with an embodiment of the present invention is featured by forming a tunneling insulator 12 to be formed by anodizing a surface of a base electrode of Al or Al alloy to be larger than a final specification thickness of the tunneling insulator 12 at the time of the first anodic oxidation, etching and removing a surface side of the tunneling insulator 12 to make its thickness smaller than the final specification thickness, and then forming the tunneling insulator 12 of the final specification thickness again by the anodic oxidation method.

Explanation will be made as to a method for manufacturing a thin film cathode in accordance with the present embodiment, by referring to FIGS. 1A to 2F.

In FIGS. 1A to 2F, their left sides show cross-sectional views of major parts and right sides show plane views thereof.

First of all, an insulating substrate 10 made of soda glass is prepared and a metallic film for a base electrode is formed on the insulating substrate 10.

As the material of the base electrode, Al or Al alloy is used.

In this case, Al-neodymium alloy (which will be referred to merely Nd, hereinafter) was employed.

Further, a sputtering deposition method as an example was used in formation of the metallic film and the thickness of the film was set to 300 nm.

After formation of the metallic film, a base electrode 11 in the form of a stripe is formed by etching, as shown in FIG. 1A.

Figure 1B:
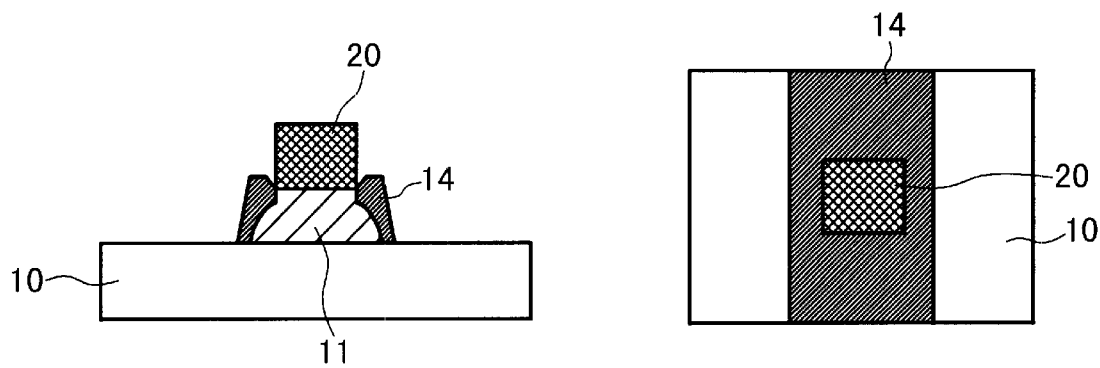

As shown in FIG. 1B, next, a top area of the base electrode 11 to be formed as an electron emitter is masked with a resist film 20, the base electrode 11 is used as an anode in an anodizing electrolyte so that the top area of the base electrode 11 other than the area to be formed as the electron emitter is anodized to be selectively thick to thereby form a protective insulator 14.

At this time, an anodizing voltage is set to 100V, the protective insulator 14 formed has a thickness of about 136 nm.

Figure 1C:
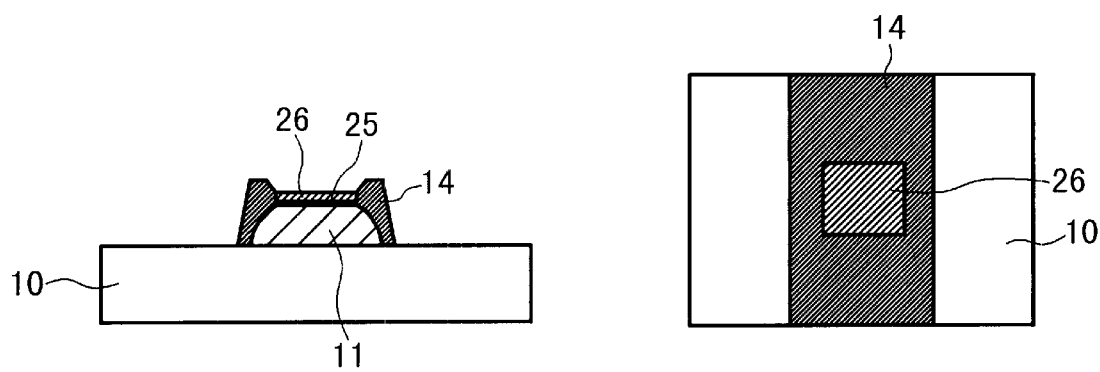

After formation of the protective insulator 14, the resist film 20 is removed and a resultant substrate is anodized with the base electrode 11 used as the anode in the anodizing electrolyte to form a anodic oxide on the base electrode 11, as shown in FIG. 1C.

Due to a ratio in transport number between aluminum ions ($Al^{3+}$) and oxygen ions ($O^{2-}$), the anodic oxide has a double structure of an insulator's outer layer 26 and an insulator's inner layer 25.

Used in this example as the electrolyte of the anodizing electrolyte is a mixture solution of 3wt% of an aqueous solution of ammonium tartrate and ethylene glycol.

In this case, since the transport number ratio between aluminum ($Al^{3+}$) and oxygen ($O^{2-}$) ions is about 0.6:0.4, about 60% of the thickness of the insulator is occupied by the insulator's outer layer 26 and 40% thereof is occupied by the insulator's inner layer 25.

For this reason, the anodic oxide to be first formed is set to have a thickness corresponding to 2.5 times the thickness of the tunneling insulator 12 of the final thin film cathode.

Since the thickness of the anodic oxide is proportional to the anodizing voltage, the film thickness can be set accurately.

When the initial film thickness is set to be 2.5 times or more the final film thickness in this way, the final specification thickness can be secured only with the insulator's inner layer 25, which is especially preferable.

It goes without saying that, even when the film thickness is not 2.5 time or more, the ratio of the insulator's outer layer 26 can be smaller than that of the prior art so long as the manufacturing method of the present invention is employed.

In this example, the anodizing voltage was set to 15V and the anodic oxide was formed to have a thickness of about 25 nm.

In other words, the insulator's inner layer 25 has a thickness of 10 nm and the insulator's outer layer 26 has a thickness of 15 nm.

Subsequently a surface of the anodic oxide first formed is etched in an etchback method.

Etching can be carried out by wet etching or dry etching, but etching using an aqueous solution of alkali, in particular, is low in etching rate and high in uniformity.

For example, an alkali aqueous solution of phosphates or silicates, an aqueous mixture solution of ammonium and hydrogen peroxide, or an aqueous solution of organic alkali may be employed.

Figure 4:
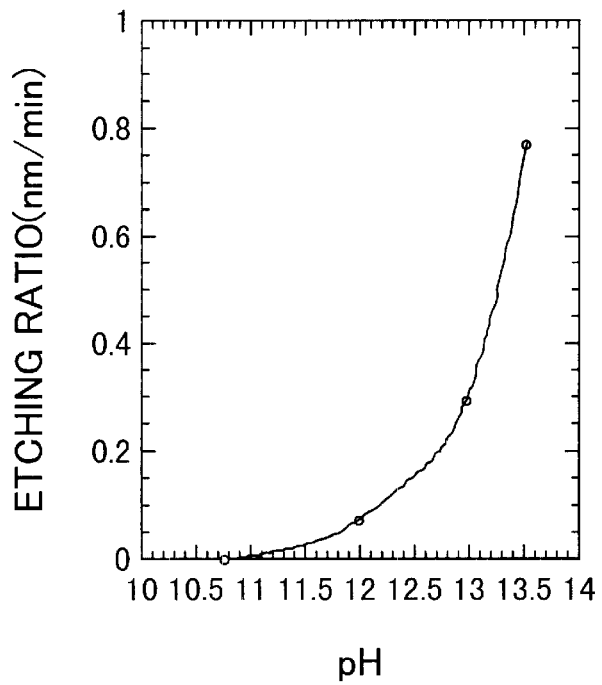
FIG. 4 is a graph showing an etching rate of the insulator when an etchant is used in the embodiment of the present invention.

In this case, as shown in FIG. 4, by adjusting pH in a range of about 11 to 13.5, an etching rate can be freely controlled to be an ultra-low etching rate as low as between 0.1 and 1 nm/min. and etching can be realized highly uniformly with an irregular film thickness of about 1 nm.

Accordingly, this etching is optimum for etching a thin inner layer (anodic oxide) in a thin film cathode.

Further, when phosphates or silicates are used as an etchant, the film quality of the insulator can be further improved, since phosphoric acid ions or silicic acid ions act to improve the water resistance of the surface of the anodic oxide.

In this case, an alkali mixture aqueous solution of disodium hydrogenphosphate and sodium silicate of pH 13 was used.

This etching causes removal of layers including the insulator's outer layer 26 in the first-formed anodic oxide, and also causes the insulator's inner layer 25 to be left.

Since the thickness of the insulator's outer layer 26 is known from the anodizing voltage and transport number, the insulator's inner layer 25 can be left and the insulator's outer layer 26 can be removed by controlling the etching time.

When the etchant in the present embodiment is used, highly uniform etching can be realized. Nevertheless, an irregular film thickness of about 1 nm by etching and local pinholes caused by grain boundary or foreign matters will take place.

For this reason, the reliability of the insulator after subjected to only the etching method is low.

Figure 2D:
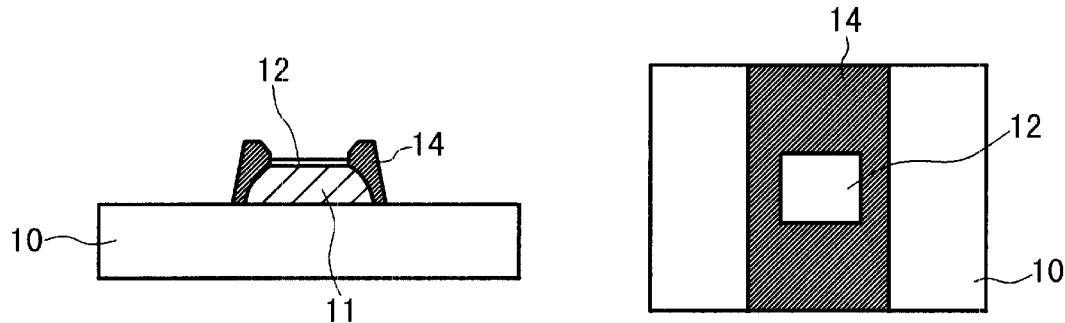
FIGS. 2D to 2F are diagrams for explaining a method for manufacturing the thin film cathode in accordance with the first embodiment of the present invention.

To avoid this, as shown in FIG. 2D, for the purpose of eliminating fluctuations in the thickness of the insulator's inner layer 25 and local defects caused by etching, the anodic oxidation is again carried out to form the tunneling insulator 12.

Figure 5:
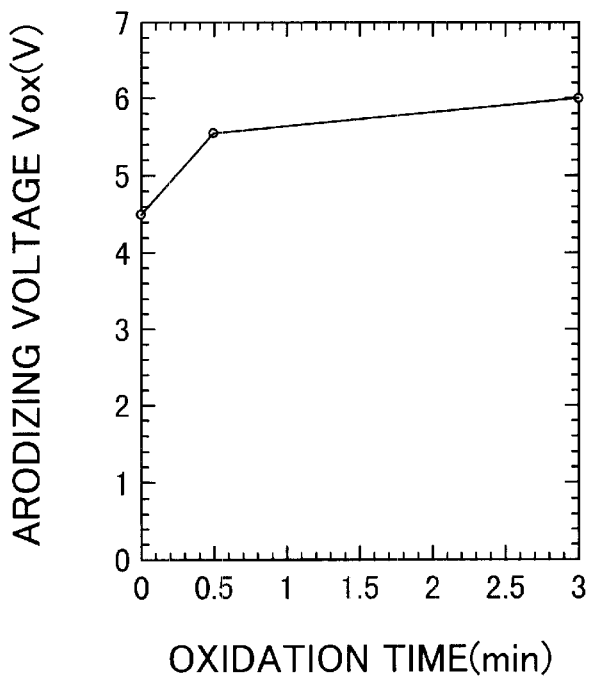
FIG. 5 is a graph showing a relationship between anodizing voltage and anodizing time of re-anodic oxidation in the embodiment of the present invention.

A relationship between the then anodizing voltage and oxidizing time is shown in FIG. 5.

As will be seen from FIG. 5, the initial value of the anodizing voltage was about 4.5 V.

Since only an area of local pinholes and thinner part of irregular film is oxidized in the first stage, the anodizing voltage quickly increases up to about 5.5 V.

After the film thickness irregularity is removed, the oxidizing speed becomes the same as that of the usual anodic oxidation.

In this case, a final anodizing voltage was set to 6 V and the thickness of the tunneling insulator 12 was set to about 10 nm.

FIG. 3 shows, in a model form, changes in the film structure of the tunneling insulator 12 prepared by anodic oxidation, etching and re-anodizing methods in the present embodiment.

The film thickness of the anodic oxide additionally grown by the re-anodizing is about 2 nm which corresponds to 1.5 V correspond of an anodizing voltage.

Even at the time of the re-anodizing, the anodic oxide grown is divided into both sides of the insulator's inner layer 25 depending upon a ratio of 0.6:0.4 in transport number between aluminum ions ($Al^{3+}$) and oxygen ions ($O^{2-}$), which results in that the insulator's outer layer 26 containing much impurity has a thickness of about 1.2 nm.

In the case where a thin film cathode is prepared only by one anodizing operation in the prior art, if the insulator is formed to have a thickness of 10 nm, then the insulator's outer layer 26 containing much impurity has a thickness of 6 nm.

Accordingly, in the present embodiment, this indicates that the thickness of the insulator's outer layer 26 in the tunneling insulator 12 can be reduced to ⅕.

In other words, even when an aqueous solution of ammonium borate providing a low ratio of the insulator's outer layer is used in the prior art method for manufacturing a thin film cathode, the film thickness ratio of the insulator's outer layer 26 occupied by the film thickness of the tunneling insulator 12 corresponds to 40% or more; whereas, when the method of the present embodiment is used, the film thickness ratio of the insulator's outer layer 26 can be made to be far smaller than 40%.

Further, although the etching and re-anodizing have been carried out each once, but may be also repeated a plurality of times.

Next, a metallic film for a top electrode busline lower layer to be formed as a power supply lines to the top electrode 13 as well as a metallic film for a top electrode busline upper layer are formed by sputtering.

In the present embodiment, tungsten (W) was used as the material of a bus electrode busline lower layer 15, and Al—Nd alloy as an example was used as the material of a bus electrode busline upper layer 16.

Figure 2E:
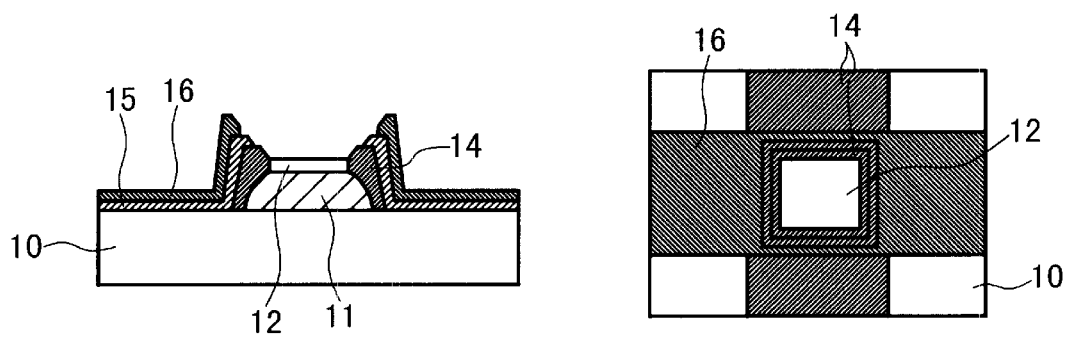

As shown in FIG. 2E, top electrode busline lower and upper layers 15 and 16 having desired shapes are formed by etching.

In this case, tungsten (W) of the top electrode busline lower layer 15 is principally provided for electrical contact with the top electrode 13, while Al—Nd alloy of the top electrode busline upper layer 16 is principally provided for power supply.

Figure 2F:
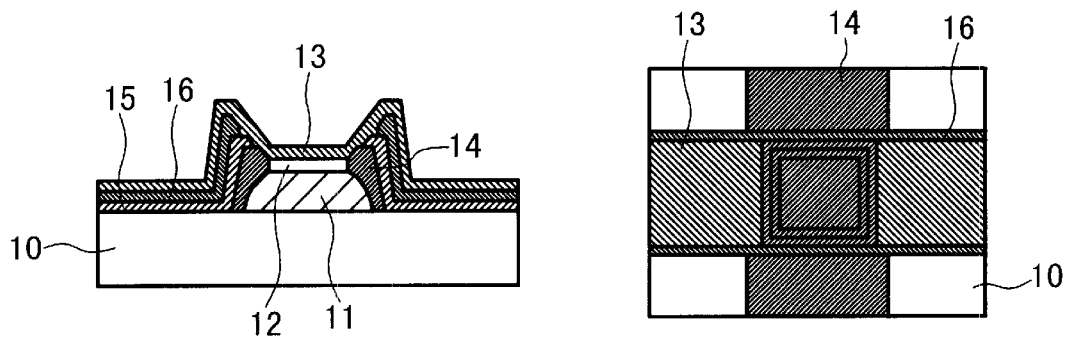

As shown in FIG. 2F, finally, a metallic film for the top electrode is formed and processed to form the top electrode 13.

The top electrode 13 was made of a laminated film of, e.g., iridium (Ir), platinum (Pt) and gold (Au) layers, and was formed by sputtering.

In the present embodiment, the thickness of the top electrode 13 was set to 3 nm.

Figure 6:
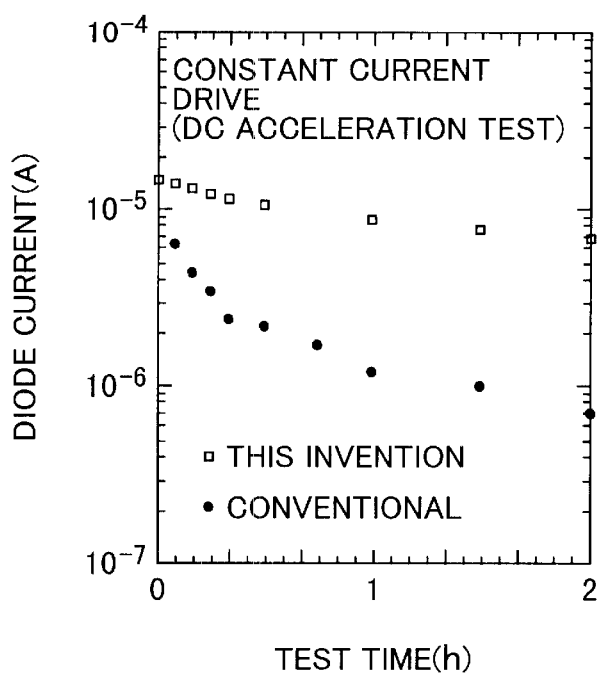
FIG. 6 is a graph showing a comparison between a thin film cathode in accordance with the present embodiment and a prior art thin film cathode in the variations of a diode current with time.

FIG. 6 is a graph showing a comparison between thin film cathodes of the prior art and present embodiment when operated or driven with a constant D.C. voltage in the variations of diode currents (flowing from the top electrode 13 to the base electrode 11) with time.

Test conditions are that a D.C. current is applied to cause an initial diode current to have a current density of 0.2 $A/cm^2$.

This current density corresponds to 15 $\mu A$ for the surface area of the electron emitter in the present embodiment.

In the prior art thin film cathode, the diode current is reduced remarkably to about 5% of its initial value after a 2-hour test.

In the thin film cathode of the present embodiment, meanwhile, the diode current is decreased by an amount as small as about 50% of its initial value.

Figure 7:
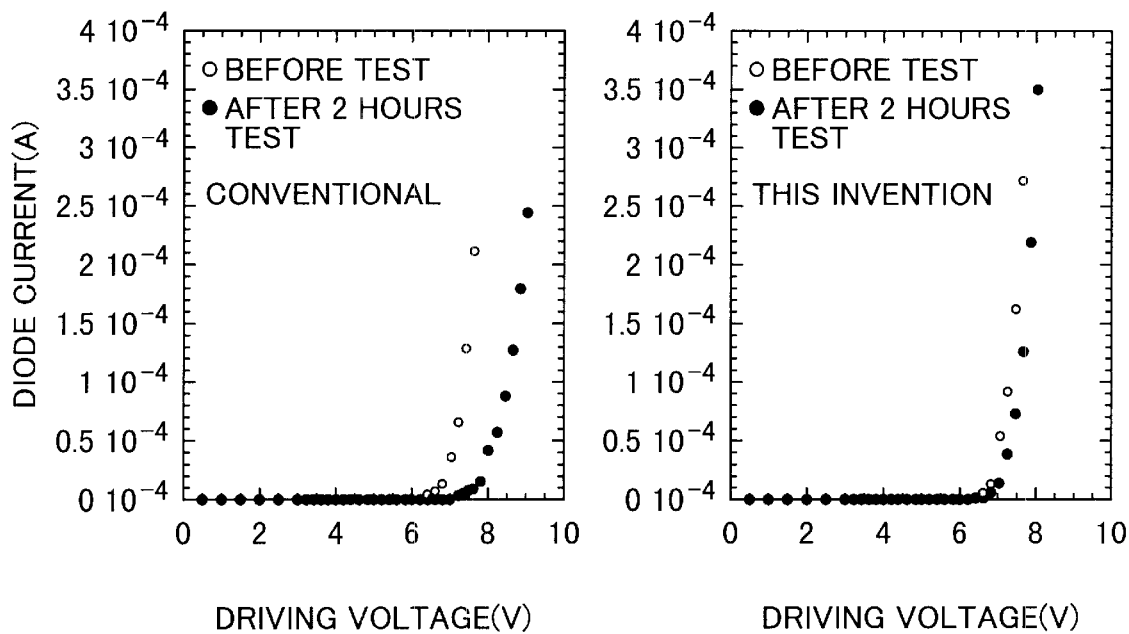
FIG. 7 is a graph showing a comparison between the thin film cathode in accordance with the present embodiment and the prior art thin film cathode in the variations of a current/voltage characteristic.

FIG. 7 is a graph showing measurements of variations in a diode current/driving voltage (IV characteristic) before and after the test of FIG. 6.

As shown in FIG. 7, it will be seen therefrom that, in the prior art thin film cathode, the IV characteristic is shifted toward its high voltage side largely, i.e., by about 1V, which means that a lots of electron trap will be generated.

In contrast to the prior art, in the thin film cathode of the present embodiment, it will be seen that, as shown in FIG. 7, its IV characteristic less fluctuates, that is, is shifted by an amount as only small as 0.1–0.2 V with the result of a less amount of electron trap.

It will be appreciated from the above result that the manufacturing method of the present embodiment can advantageously obtain a thin film cathode wherein the thickness of the insulator's outer layer 26 containing much impurity is remarkably reduced to decrease an electron trap density and to reduce an decrease in an emission current.

Figure 8:
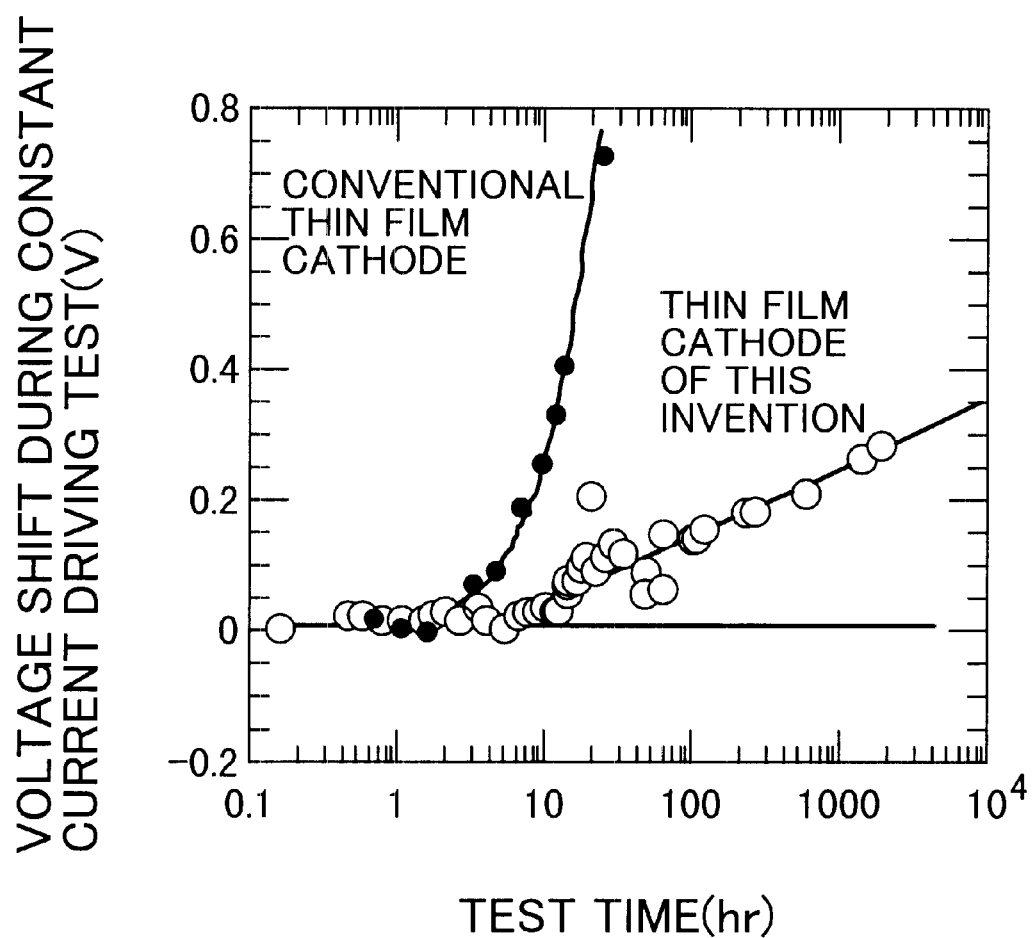
FIG. 8 is a graph showing a comparison between the thin film cathode in accordance with the present embodiment and the prior art thin film cathode in the variations of a driving voltage in the case of constant current pulse drive.

FIG. 8 is a graph plotting variations with time in driving voltages of thin film cathodes of the prior art and present embodiment when operated or driven by pulse voltage to flow constant current.

A diode current density was tested with a peak current density of 0.2 $A/cm^2$ (an average current density of 11 $mA/cm^2$).

A pulse waveform was set to have a period of 16.7 ms and a duty ratio of 1/18.3 on the assumption of use in a display device.

Assuming the number of scan lines is 512 (256 lines in each of upper and lower division drive) in an actual display device, then this test is an acceleration test using in the display device a pulse having a duty ratio of 14 times 1/256.

A test time in abscissa of FIG. 8 is expressed in terms of such a calculated conversion time (measurement time×14).

As seen from FIG. 8, in the prior art thin film cathode, a driving voltage for keeping a constant current increases even by 0.8 V with a small duration of time of only 20 hours, because of an increase in the amount of electron trap, which leads to element destruction.

In the thin film cathode of the present embodiment, on the other hand, since the amount of electron trap is less, an increase in the driving voltage can be suppressed to 0.35 V even when the cathode is driven for 714 hours (10,000 hours as the conversion time calculated for the duty ratio of 1/256).

In an actual display device, in order to enable correction of a voltage increase in the drive circuit and to avoid deterioration in the reliability of the thin film cathode, the voltage increase is desirably 0.5 V or less.

Accordingly, when the manufacturing method of the present embodiment is employed, there can be realized a practical display device which uses the thin film cathode and has a life of 10,000 hours.

Embodiment 2

Figure 9A:
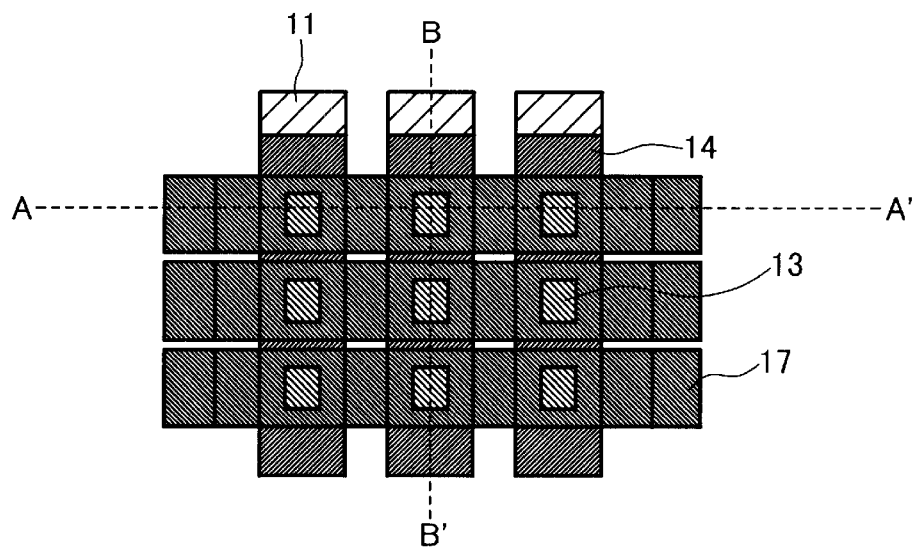
FIGS. 9A to 9C show a schematic arrangement of an array substrate in a thin film cathode of a display device in accordance with a second embodiment of the present invention.
Figure 9B:
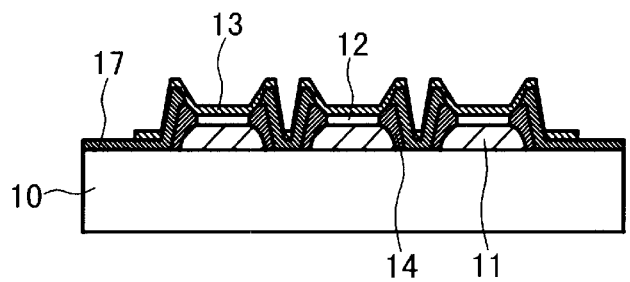
Figure 9C:
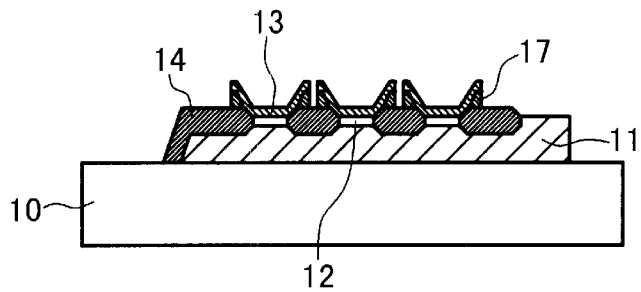

FIGS. 9A to 9C show a schematic structure of an array substrate of a thin film cathode for a display device in accordance with a second embodiment of the present invention.

FIG. 9A is a plain view of the array substrate of the thin film cathode in the present embodiment, FIG. 9B is a cross-sectional view of FIG. 9A taken along line A–A', and FIG. 9C is a cross-sectional view of a major part of FIG. 9A taken along line B–B'.

The thin film cathode array substrate of the present embodiment is formed on a substrate 10 according to a procedure already explained above so that the thin film cathode is arranged in the form of a matrix.

Although a thin film cathode matrix of (3×3) dots which includes three base electrodes 11 and three top electrode buslines 17 is illustrated in FIGS. 9A to 9C, the matrix is formed actually by a number corresponding to the number of display dots.

Further, the top electrode busline is actually of a laminated structure of the top electrode busline lower layer 15 and top electrode busline upper layer 16, but is collectively illustrated as the top electrode buslines 17 in FIGS. 9A to 9C.

Figure 10A:
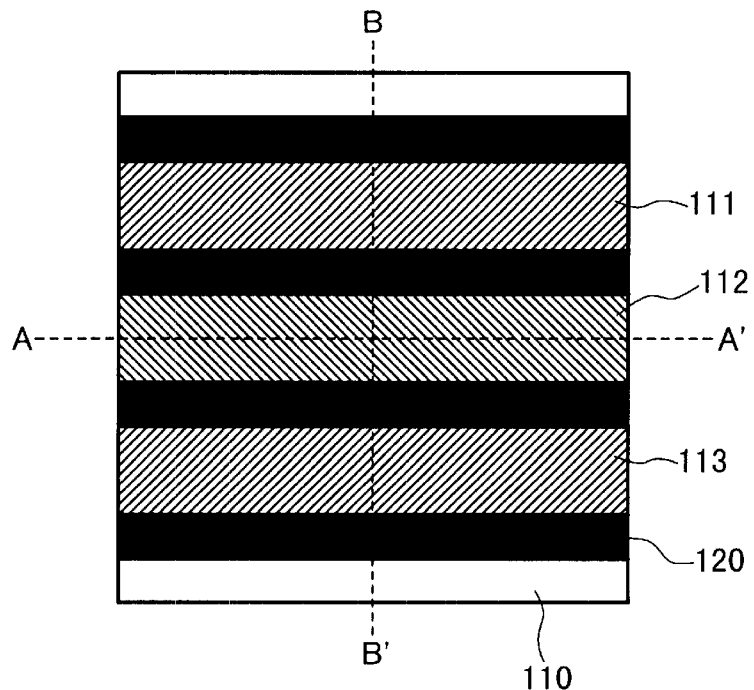
FIGS. 10A to 10C show a schematic arrangement of a phosphor display plate in a display device in accordance with the second embodiment of the present invention.
Figure 10B:
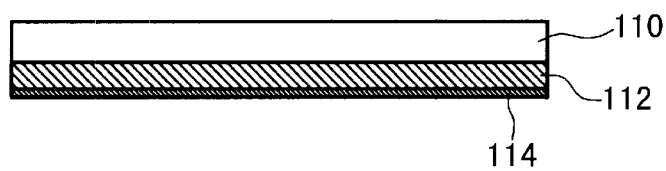
Figure 10C:
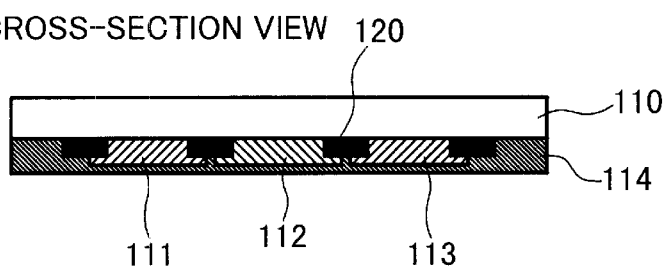

Shown in FIGS. 10A to 10C is a schematic structure of a phosphor plate in the display device of the present embodiment of the invention.

FIG. 10A is a plan view of the phosphor plate in the present embodiment, FIG. 10B is a cross-sectional view of FIG. 10A taken along line A–A', and FIG. 10C is a cross-sectional view of a major part of FIG. 10A taken along line B–B'.

The phosphor plate of the present invention includes a black matrix 120 formed on a substrate 110 of soda glass or the like, phosphers 111 to 113 of red (R), green (G) and blue (B) formed in grooves in the black matrix 120, and a metal back film 114 formed thereon.

Explanation will then be made as to how to prepare a phosphor plate in the present embodiment.

First of all, for the purpose of increasing contrast of the display device, a black matrix 120 is formed on a substrate 110.

The black matrix 120 is formed by coating on the substrate 110 a mixture solution of polyvinylalcohol (which will be referred to merely as PVA, hereinafter) and ammonium bichromate, irradiating ultraviolet light on an area of the substrate other than a desired area where the black matrix 120 is to be formed for light exposure, removing the non-exposed area, coating a solution having powder of black lead dissolved therein on the removed area, and then lifting off PVA.

Next the red-color phosphor 111 is formed in a manner to be explained below.

An aqueous solution of ammonium bichromate mixed into particles of the red phosphor is coated on the substrate 110, the resultant substrate is subjected to irradiation of ultraviolet light on an area for formation of the phosphor for light exposure, and then a non-exposure area is removed with running water.

In this manner, the red-color phosphor 111 is made into a pattern.

In this connection, the phosphor pattern has such a stripe shape as shown in FIGS. 10A to 10C, but the stripe pattern is provided only as an example. Thus, any pattern other than the stripe pattern can be used according to the display design. For example, a 'RGBG' pattern having adjacent 4 dots formed as a single pixel may be employed.

In a similar manner, the green phosphor 112 and blue phosphor 113 are formed.

In this case, for example, the red-color phosphor 111 may be made of Y2O2S:Eu(P22-R), the green phosphor 112 may be made of ZnS:Cu,Al(P22-G), and the blue phosphor 113 may be made of ZnS:Ag(P22-B).

Subsequently, the resultant substrate is covered with a film of nitrocellulose or the like, and then the entire substrate 110 is deposited with a thin Al film of about 75 nm in thickness to form a metal back film 114.

The metal back film 114 acts as an acceleration electrode.

Thereafter the substrate 110 is heated to about 400° C. in an atmosphere to thermally break down an organic material such as the film or PVA.

In this manner, the phosphor plate is completed.

Figure 11A:
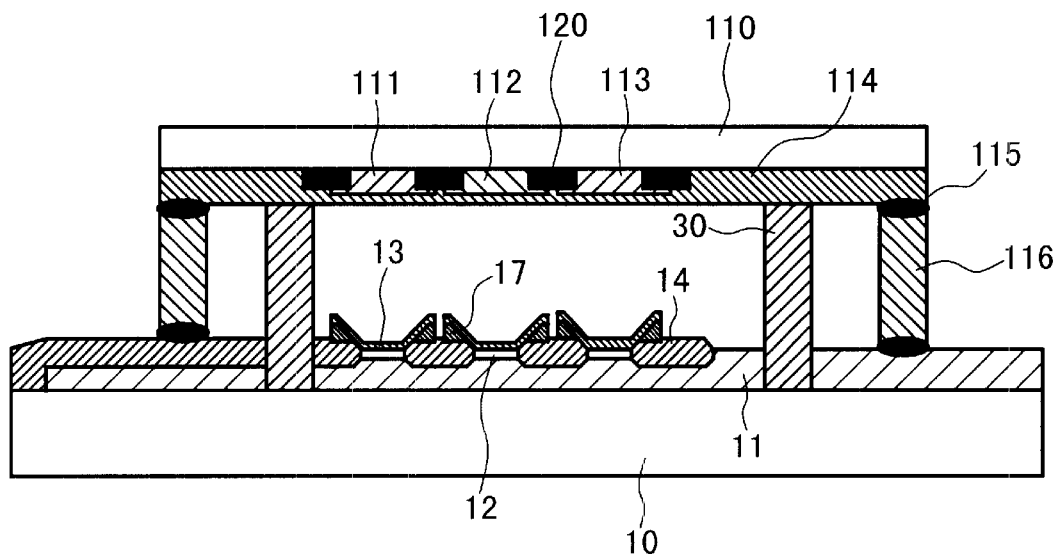
FIGS. 11A and 11B show cross-sectional views of a schematic entire arrangement of the display device in accordance with the second embodiment of the present invention.
Figure 11B:
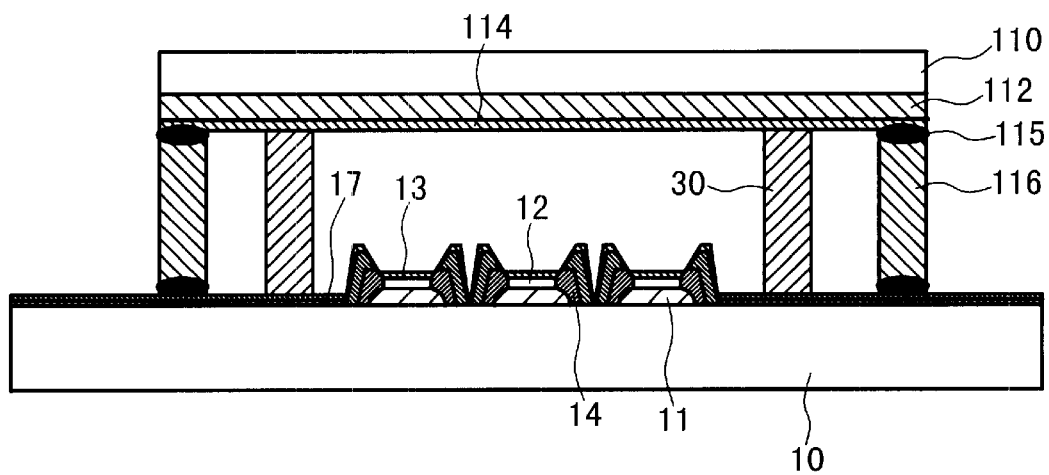

FIGS. 11A and 11B are cross-sectional views of a general schematic arrangement of a display device in accordance with the second embodiment of the invention.

FIG. 11A is a cross-sectional view of FIG. 9A taken along line B–B', and FIG. 11B is a cross-sectional view of a major part of FIG. 9A taken along line A–A'.

As shown in FIGS. 11A and 11B, the thin film cathode array substrate, phosphor plate prepared by the above procedure, and a frame 116 are assembled through spacers 30, and then the frame 116 is sealed with use of frit glass 115.

A distance between the thin film cathode array substrate and phosphor display plate is set to about 1–3 mm by adjusting the height of the spacers 30.

Although one spacer 30 as supporting struts is provided for dots of emitting red (R), green (G) and blue (B), that is for each 3 columns of base electrodes in FIGS. 11A and 11B, the number of such supporting struts (density) may be decreased so long as the supports can produce a sufficient mechanical strength.

In this case, the spacers 30 are formed by making a desired shape of holes, e.g., by sandblasting in an insulating plate of about 1–3 mm thickness and made of glass or ceramics.

Or glass-made (or ceramics-made) supports of a plate or column shape may be arranged as the spacers 30.

Sealing of a panel is carried out by evacuating it to a vacuum level of about $10^{-7}$ Torr and then sealing it.

After sealed, the getter is activated and the interior of the display device is kept at the vacuum level.

For example, when the getter is made of a material containing barium (Ba) as its main component, a getter film can be formed by a high frequency induction heating.

In this manner, a display device of the present embodiment is completed.

In the display device of the present embodiment, since a distance between the thin film cathode array substrate and phosphor display plate is as long as about 1–3 mm, an acceleration voltage to be applied to the metal back film 114 can be made as high as 3–6 KV.

Therefore, as mentioned above, the same phosphor as used in a cathode ray tube (CRT) can be used.

When the thin film cathode matrix structure of the first embodiment is employed in the present embodiment, since the amount of electron trap is small, decreases in the diode current and emission current are small. Thus since a thin film cathode having a long life can be prepared, there can be provided a display device which is small in the brightness decrease and high in reliability.

Figure 12:
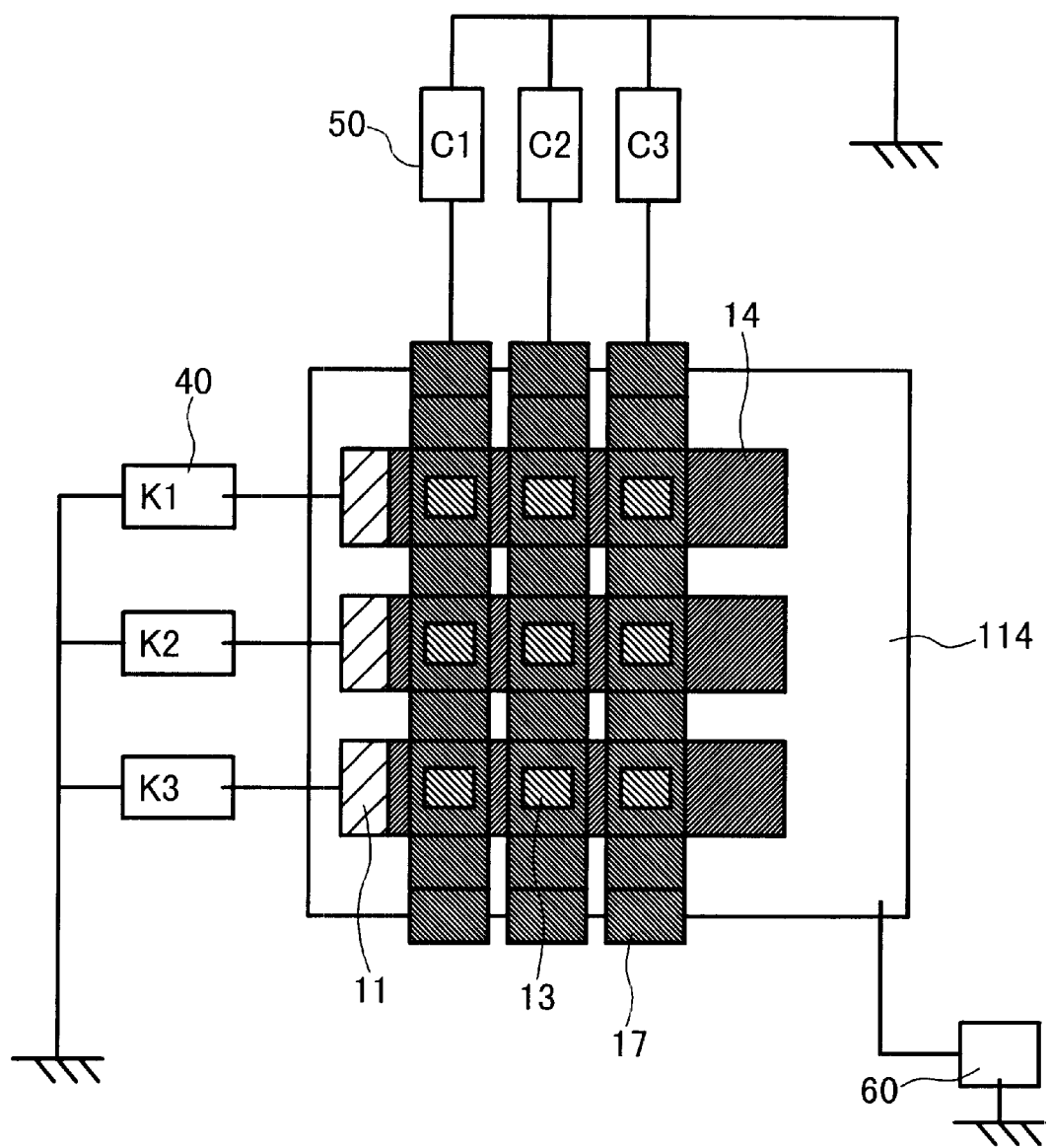
FIG. 12 shows a condition when the display device of the second embodiment of the invention is connected to a drive circuit.

FIG. 12 shows, in a model form, a state in which drive circuits are connected to the display device of the present embodiment.

The base electrodes 11 are driven by drive circuits 40 and the top electrode buslines 17 are driven by drive circuits 50.

In this case, interconnection between the drive circuits 40 and 50 and the thin film cathode array substrate is carried out, for example, by a method of forming a crimp-type one by compressing an anisotropic conductive film to a tape carrier package, or by a chip-on-glass method of directly mounting a semiconductor chip forming the drive circuits 40 and 50 on the thin film cathode array substrate (made of, e.g., glass).

An acceleration voltage of about 3–6 KV is applied at all times from an acceleration voltage source 60 to the metal back film 114.

Figure 13:
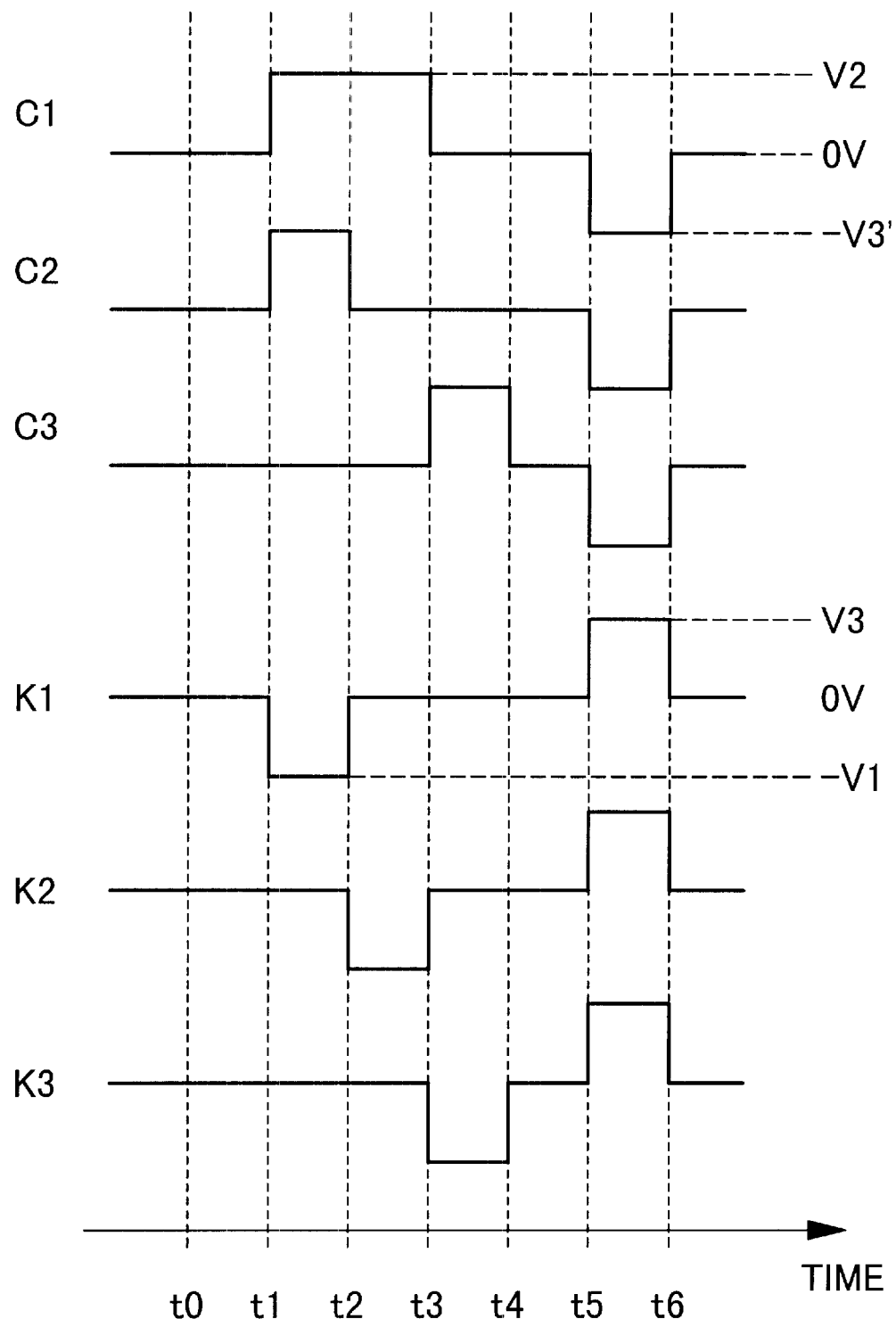
FIG. 13 shows waveforms of driving voltages outputted from the respective drive circuits in FIG. 11.
Figure 14:
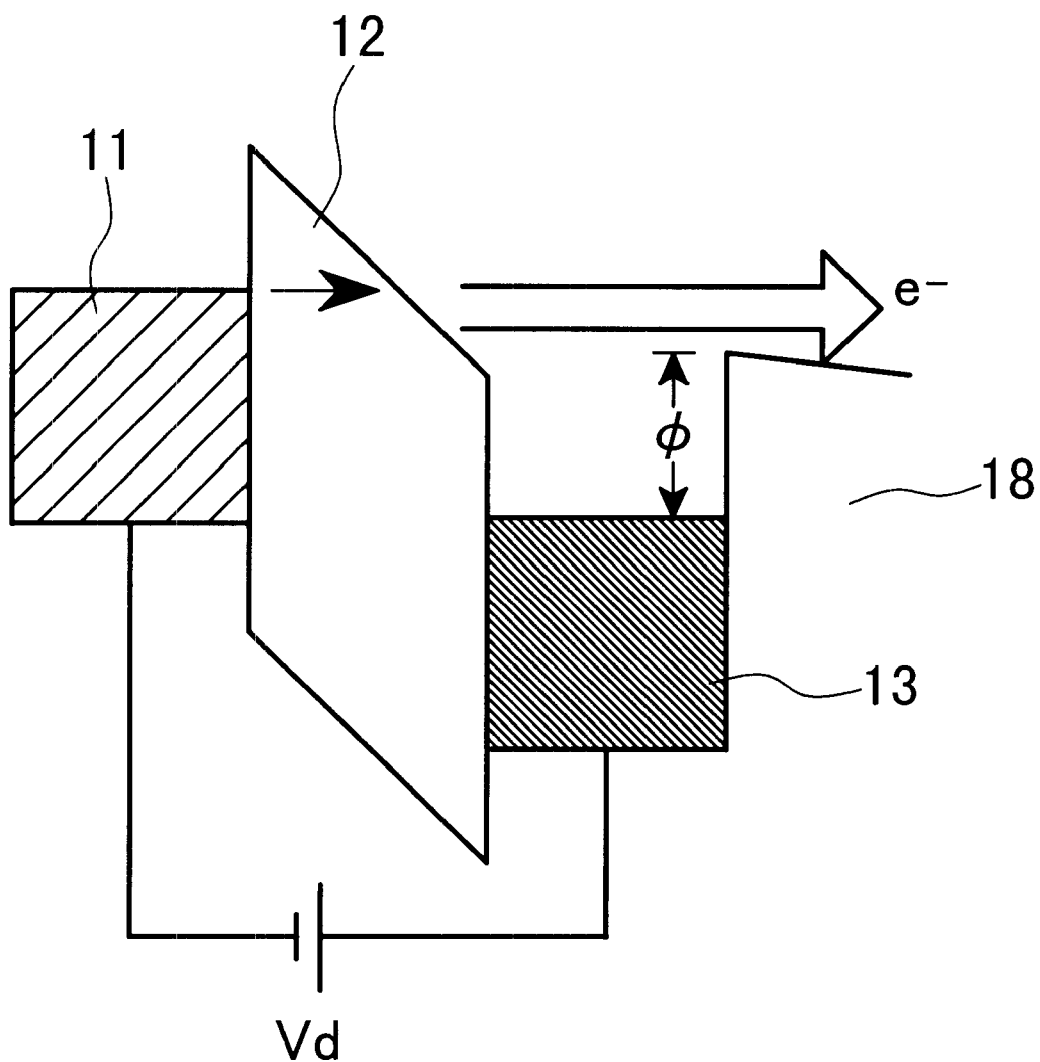
FIG. 14 is a diagram for explaining the operational principle of a thin film cathode.
Figure 15:
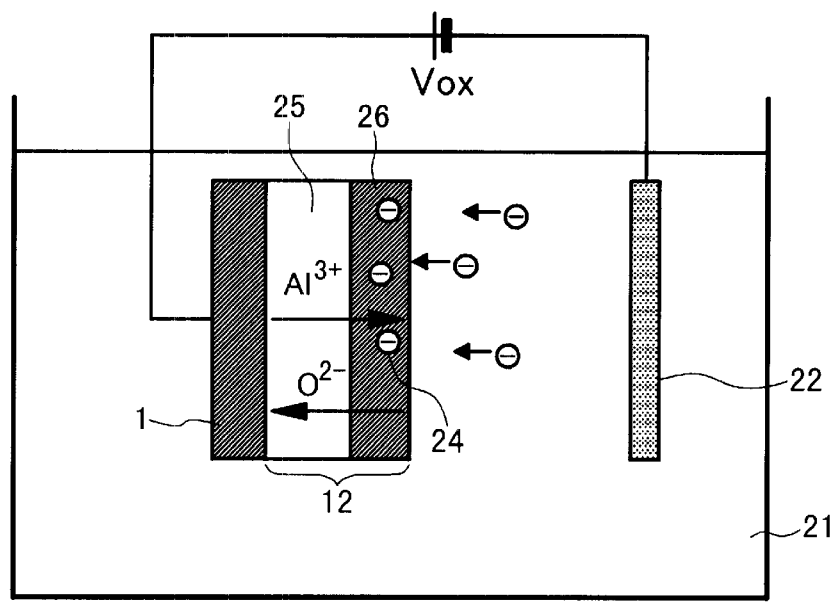
FIG. 15 shows, in a model form, a method for forming an anodic oxide.
Figure 16:
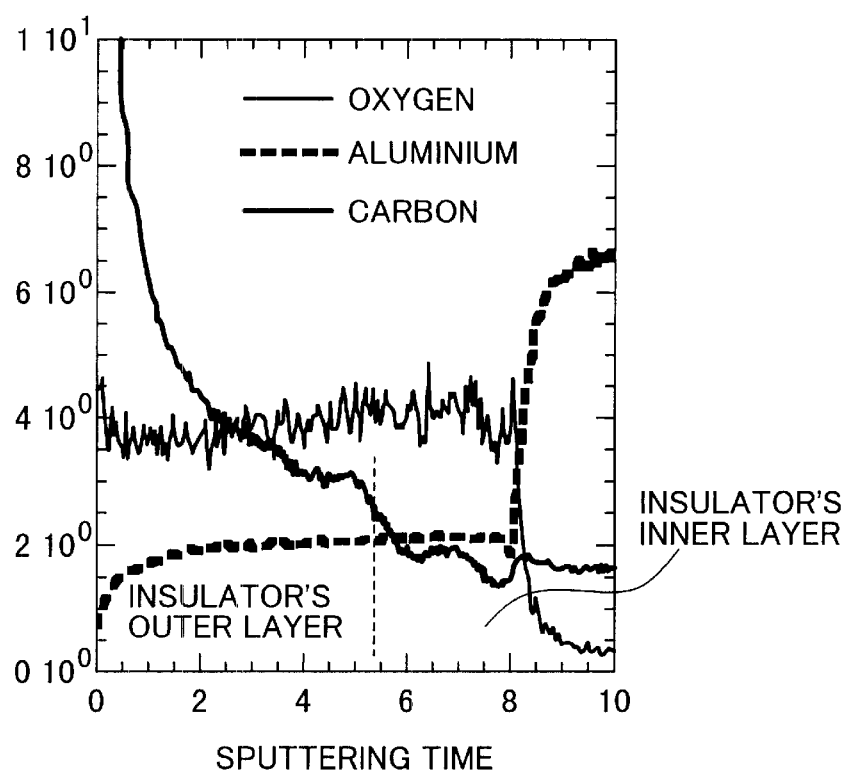
FIG. 16 is a graph showing results of measurement of composition analysis based on glow discharge spectroscopy of a tunneling insulator in a prior art thin film cathode formed by an anodic oxidation method.
Figure 17:
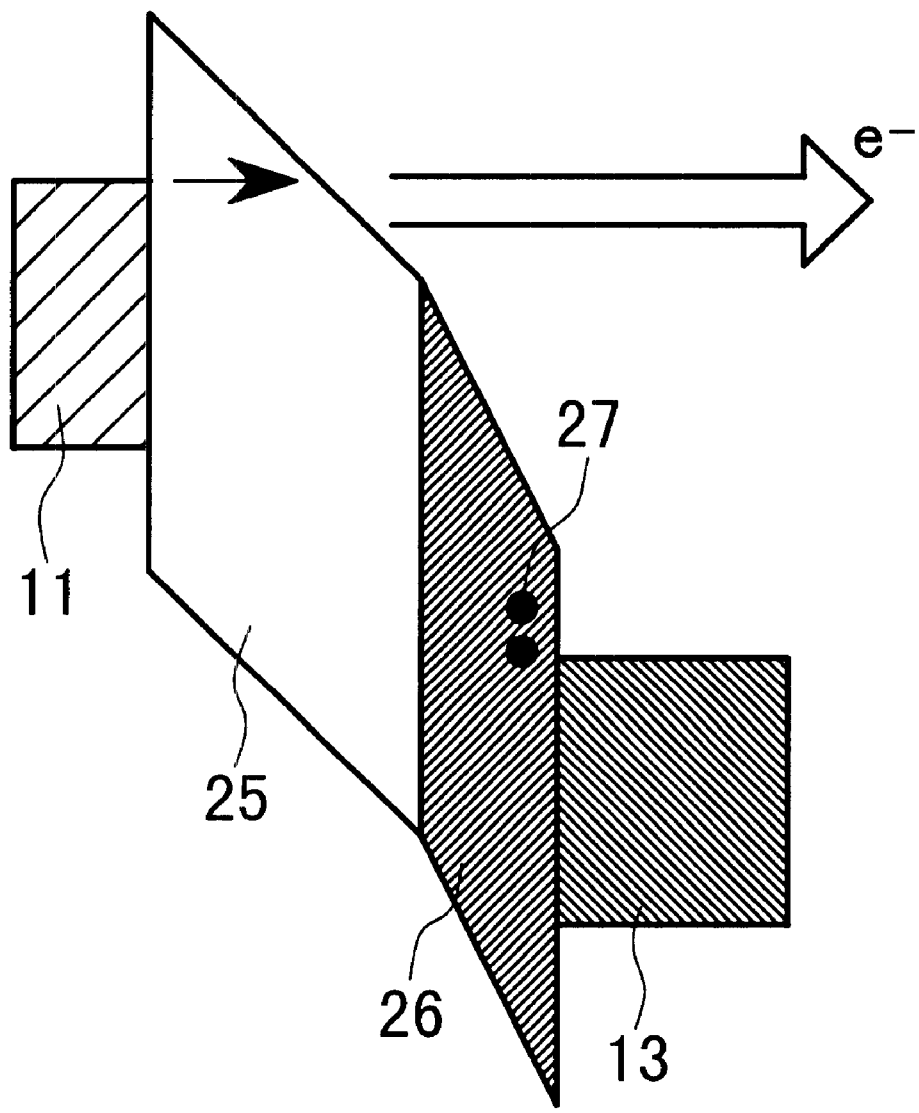
FIG. 17 shows a conduction band when the prior art thin film cathode is operated.

FIG. 13 is a timing chart showing an example of waveforms of driving voltages outputted from the respective drive circuits shown in FIG. 12.

In the drawing, the m-th base electrode 11 is denoted by reference Km, the n-th top electrode buslines 17 is denoted by Cn, and an intersection between the m-th base electrode 11 and n-th top electrode buslines 17 is denoted by (m, n).

At a time t0, since any of the electrodes has a driving voltage of zero, no electrons will be emitted and thus the phosphors will not fluoresce.

At a time t1, a driving voltage of (−V1) is applied from the drive circuit 40 to the base electrode 11 or K1, and a driving voltage of (+V2) is applied from the top electrode drive circuit 50 to the top electrode top electrode buslines 17 or C1 and C2.

A voltage of (V1+V2) is applied to between the base and top electrodes 11 and 13 at intersections (1,1) and (1,2), so that the voltage of (V1+V2) is previously set to an electron emission threshold voltage or more, emissions will be emitted from thin film cathodes at these two intersections.

After emitted electrons are accelerated by an acceleration voltage of an accelerating voltage source 60 applied to the metal back film 114, the electrons are directed to the phosphors 111 to 113 for light emission.

At a time t2, a driving voltage of (−V1) is applied from the base electrode drive circuit 40 to the base electrode 11 or K2, and a driving voltage of (+V2) is applied from the top electrode drive circuit 50 to the top electrode top electrode busline 17 or C1, which results in that an intersection (2,1) similarly emits light.

In this way, by changing a signal applied to the top electrode top electrode busline 17, a desired image or information can be displayed.

Further, by suitably changing the amplitude of the driving voltage of (+V2) applied to the top electrode top electrode buslines 17, a gradated image can be displayed.

In this connection, application of an inverted voltage to release electric charges accumulated in the tunneling insulator 12 was carried out, in this embodiment, by applying a driving voltage of (−V1) from the base electrode drive circuit 40 and thereafter applying a driving voltage of (+V3) from the base electrode drive circuit 40 to all the base electrodes 11 and applying a driving voltage of (−V3') from the top electrode drive circuit 50 to all the top electrode top electrode buslines 17.

In this case, a voltage of (V3+V3') is set to be equal nearly to a voltage of (V1+V2).

As mentioned above, the invention made by the inventors of the present application has been described in detail based on the aforementioned embodiments. However, it will clearly go without saying that the present invention is not limited to the foregoing embodiments, but may be modified in various ways so long as the modifications do not depart from its gist or subject matter.

INDUSTRIAL APPLICABILITY

The effects of typical embodiments of the invention disclosed in the present application are summarized as follows.

(1) In the thin film cathode of the present invention, the thickness of the insulator's outer layer containing much impurity in the insulator formed as the anodic oxide can be made small and thus the amount of electron trap can be reduced. As a result, decrease in the emission current and reduction in the reliability can be avoided.

(2) In the display device of the present invention, since the thin film cathode matrix structure of the present invention is employed, a less amount of electron trap can be obtained. As a result, the diode current and emission current can be less decreased and a thin film cathode having a long life can be prepared, thus enabling minimization of brightness reduction and improvement of the reliability.

What is claimed is:

1. A thin film cathode including an electron emitter of a three-layer thin film structure comprising a base electrode, a top electrode and an insulator provided between the base and top electrodes and formed from an anodic oxide of the base electrode, the electron emitter emitting electrons from a surface of the top electrode when a positive-polarity voltage is applied to the top electrode; said thin film cathode being characterized in that:

the insulator contains impurities a concentration of which decreases stepwise from the top electrode toward the base electrode; and when assuming a boundary of center of the impurities stepwise decreasing region, forming as an outer layer the top electrode side of the insulator and forming as an inner layer the base electrode side of the insulator with respect to the boundary, a film thickness ratio of the insulator's outer layer to the film thickness of the insulator is smaller than 40%.

2. A thin film cathode as set forth in claim 1, wherein said base electrode is made of aluminum or aluminum alloy.

3. A thin film cathode as set forth in claim 1, wherein said electron emitter is arranged in the form of a matrix.

4. A thin film cathode comprising an electron emitter of a three-layer thin film structure of a base electrode, a top electrode and an insulator provided between said base and top electrodes and formed from an anodic oxide of said base electrode, said electron emitter emitting electrons from a surface of said top electrode when a positive-polarity voltage is applied to said top electrode; said thin film cathode being characterized in that:

when a test is conducted wherein an initial current flowing from said top electrode to said base electrode is set to have a current density of 0.2 A/cm$^2$ and a D.C. voltage is applied between said top and base electrodes of said electron emitter, a current flowing from said top electrode to said base electrode is not smaller than 50% of said initial current after lapse of 2 hours.

5. A thin film cathode as set forth in claim 4, wherein said base electrode is made of aluminum or aluminum alloy.

6. A thin film cathode as set forth in claim 4, wherein said electron emitter is arranged in the form of a matrix.

7. A thin film cathode including an electron emitter of a three-layer thin film structure comprising a base electrode, a top electrode and an insulator provided between the base and top electrodes and formed from an anodic oxide of the base electrode, the electron emitter emitting electrons from a surface of the top electrode when a positive-polarity voltage is applied to the top electrode; said thin film cathode being characterized in that:

when a test is conducted wherein an initial current flowing from the top electrode to the base electrode is set to have a current density of 0.2 A/cm$^2$ and a D.C. voltage is applied between the top and base electrodes of the electron emitter, a shift in a current-driving voltage characteristic is shifted to its high voltage side after two hours with the shift being 0.5 V or less.

8. A thin film cathode as set forth in claim 7, wherein said base electrode is made of aluminum or aluminum alloy.

9. A thin film cathode as set forth in claim 7, wherein said electron emitter is arranged in the form of a matrix.

10. A thin film cathode including an electron emitter of a three-layer thin film structure comprising a base electrode, a top electrode and an insulator provided between the base and top electrodes and formed from an anodic oxide of the base electrode, the electron emitter emitting electrons from a surface of the top electrode when a positive-polarity voltage is applied to the top electrode; said thin film cathode being characterized in that:

when a constant current pulse test is conducted wherein a pulse voltage is applied between the top and base electrodes of the electron emitter with a current flowing from the top electrode to the base electrode having a peak current density of 0.2 A/cm$^2$ and with a duty ratio of 1/18.3, an increase in a driving voltage after 714 hours (after 10,000 hours, conversion hours, in the case of a duty ratio of 1/256) is 0.5 V or less.

11. A thin film cathode as set forth in claim 10, wherein said base electrode is made of aluminum or aluminum alloy.

12. A thin film cathode as set forth in claim 10, wherein said electron emitter is arranged in the form of a matrix.

13. A method for manufacturing a thin film cathode comprising an electron emitter of a three-layer thin film structure of a base electrode, a top electrode and an insulator provided between said base and top electrodes and formed from an anodic oxide of said base electrode, said electron emitter emitting electrons from a surface of said top electrode when a positive-polarity voltage is applied to said top electrode; said method being characterized by:

a first step of forming an anodic oxide on the surface of said base electrode by an anodic oxidation method at the time of forming an insulator on the surface of said base electrode by the anodic oxidation method;

a second step of etching and removing a surface side of said anodic oxide formed in said first step; and a third step of again forming an anodic oxide on the surface of said base electrode by the anodic oxidation method after said second step, said first to third steps being carried out at least once.

14. A method for manufacturing a thin film cathode as set forth in claim 13, wherein said base electrode which is made of aluminum or aluminum alloy.

15. A method for manufacturing a thin film cathode as set forth in claim 13, wherein an alkali aqueous solution is used as an etchant in etching in said second step.

16. A method for manufacturing a thin film cathode as set forth in claim 15, wherein an alkali aqueous solution having an pH level of 11–13.5 is used as said etchant.

17. A method for manufacturing a thin film cathode as set forth in claim 16, wherein an alkali aqueous solution containing at least one of phosphates and silicates is used as said etchant.

18. A method for manufacturing a thin film cathode as set forth in claim 15, wherein an alkali aqueous solution containing at least one of phosphates and silicates is used as said etchant.

19. A method for manufacturing a thin film cathode comprising an electron emitter of a three-layer thin film structure of a base electrode, a top electrode and an insulator provided between said base and top electrodes and formed from an anodic oxide of said base electrode, said electron emitter emitting electrons from a surface of said top electrode when a positive-polarity voltage is applied to said top electrode; said method being characterized by:

a first step of forming an anodic oxide thicker than a final specification thickness of said insulator on the surface of said base electrode by an anodic oxidation method;

a second step of etching and removing a surface side of said anodic oxide formed in said first step; and a third step of forming an anodic oxide of said final specification thickness on the surface of said base electrode by the anodic oxidation method again after said second step to form said insulator.

20. A method for manufacturing a thin film cathode as set forth in claim 19, wherein said anodic oxide is formed to be 2.5 times thicker than said final specification thickness in said first step.

21. A method for manufacturing a thin film cathode as set forth in claim 20, wherein said base electrode which is made of aluminum or aluminum alloy.

22. A method for manufacturing a thin film cathode as set forth in claim 20, wherein an alkali aqueous solution is used as an etchant in etching in said second step.

23. A method for manufacturing a thin film cathode as set forth in claim 22, wherein an alkali aqueous solution having an pH level of 11–13.5 is used as said etchant.

24. A method for manufacturing a thin film cathode as set forth in claim 22, wherein an alkali aqueous solution containing at least one of phosphates and silicates is used as said etchant.

25. A method for manufacturing a thin film cathode as set forth in claim 19, wherein said base electrode which is made of aluminum or aluminum alloy.

26. A method for manufacturing a thin film cathode as set forth in claim 19, wherein an alkali aqueous solution is used as an etchant in etching in said second step.

27. A method for manufacturing a thin film cathode as set forth in claim 26, wherein an alkali aqueous solution having an pH level of 11–13.5 is used as said etchant.

28. A method for manufacturing a thin film cathode as set forth in claim 26, wherein an alkali aqueous solution containing at least one of phosphates and silicates is used as said etchant.

29. A display device comprising:

a first substrate having a cathode array;

a frame; and a second substrate having a phosphor pattern, and wherein a space defined by said first substrate, frame and second substrate is a vacuum atmosphere, and said first substrate cathode array is made of a thin film cathode, said thin film cathode having an electron emitter of a three-layer thin film structure with a base electrode, a top electrode and an insulator provided between the base and the top electrodes and formed from an anodic oxide of the base electrode, the electron emitter emitting electrons from a surface of the top electrode when a positive-polarity voltage is applied to the top.

30. A display device as set forth in claim 29, wherein said electron emitter is characterized in that the insulator contains impurities a concentration of which decreases stepwise from the top electrode toward the base electrode; and when assuming a boundary of center of the impurities stepwise decreasing region, forming as an outer layer the top electrode side of the insulator and forming as an inner layer the base electrode side of the insulator with respect to the boundary, a film thickness ratio of the insulator's outer layer to the film thickness of the insulator is smaller than 40%.

31. A display device as set forth in claim 29, wherein said electron emitter is characterized in that when a test is conducted wherein an initial current flowing from said top electrode to said base electrode is set to have a current density of 0.2 A/cm$^2$ and a D.C. voltage is applied between said top and base electrodes of said electron emitter, a current flowing from said top electrode to said base electrode is not smaller than 50% of said initial current after lapse of 2 hours.

32. A display device as set forth in claim 29, wherein said electron emitter is characterized in that when a test is conducted wherein an initial current flowing from the top electrode to the base electrode is set to have a current density of 0.2 A/cm$^2$ and a D.C. voltage is applied between the top and base electrodes of the electron emitter, a shift in a current-driving voltage characteristic is shifted to its high voltage side after two hours with the shift being 0.5 V or less.

33. A display device as set forth in claim 29, wherein said electron emitter is characterized in that when a constant current pulse test is conducted wherein a pulse voltage is applied between the top and base electrodes of the electron emitter with a current flowing from the top electrode to the base electrode having a peak current density of 0.2 A/cm$^2$ and with a duty ratio of 1/18.3, an increase in a driving voltage after 714 hours (after 10,000 hours, conversion hours, in the case of a duty ratio of 1/256) is 0.5 V or less.

* * * * *